(12) United States Patent
Fabbri (10) Patent No.: US 12,229,627 B1
(45) Date of Patent: Feb. 18, 2025

(54) SCANNER CAMERA WITH PCB-INTEGRATED LENS HOLDER

(71) Applicant: Datalogic IP Tech S.r.l., Calderara di Reno (IT)

(72) Inventor: Mattia Fabbri, Gatteo (IT)

(73) Assignee: Datalogic IP Tech S.r.l. (IT)

( * ) Notice: Subject to any disclaimer, the term of this patent is extended or adjusted under 35 U.S.C. 154(b) by 0 days.

(21) Appl. No.: 18/363,639

(22) Filed: Aug. 1, 2023

(51) Int. Cl.
*G06K 7/10* (2006.01)

(52) U.S. Cl.
CPC ................ *G06K 7/10831* (2013.01)

(58) Field of Classification Search
CPC ................................... G06K 7/10831
USPC ................................... 235/492.01
See application file for complete search history.

(56) References Cited

U.S. PATENT DOCUMENTS

| | | | |
|---|---|---|---|
| 2020/0134275 A1* | 4/2020 | Sakamoto | G06K 7/10396 |
| 2020/0142185 A1* | 5/2020 | Mao | G02B 26/10 |
| 2020/0319022 A1* | 10/2020 | Lu | H04N 17/002 |
| 2021/0021744 A1* | 1/2021 | Kim | G03B 17/02 |
| 2021/0127532 A1* | 4/2021 | Persson | H04N 23/57 |
| 2024/0019768 A1* | 1/2024 | Ding | G02B 7/021 |
| 2024/0089571 A1* | 3/2024 | Peng | H04N 23/00 |
| 2024/0107141 A1* | 3/2024 | Jo | H04N 23/57 |
| 2024/0107148 A1* | 3/2024 | Alaimo | H04N 23/55 |

FOREIGN PATENT DOCUMENTS

KR 20130104247 A 9/2013

OTHER PUBLICATIONS

Bejarano-Carbo, et al., Millimeter-Scale Ultra-Low-Power Imaging System for Intelligent Edge Monitoring, Jun. 24, 2022, 7 pps.
Introduce of Embedded Cavity PCB Manufacturing, Atlanta PCB, Oct. 19, 2020, 2 pps.
Leitgeb, et al., SMT Manufacturability and Reliability in PCB Cavities, AT&S, 30 pps., May 31, 2012.

* cited by examiner

*Primary Examiner* — Allyson N Trail
(74) *Attorney, Agent, or Firm* — Foley & Lardner LLP (57) ABSTRACT

A camera device for an optical imaging system, such as a scanner system for imaging machine-readable indicia may include at least one printed circuit board (PCB), an image sensor, and a first lens device. The PCB(s) may define a recessed area having a mounting surface therein. The image sensor may be disposed within the recessed area and may be coupled to the mounting surface of the PCB. The first lens device may be coupled to the PCB(s) and may extend into the recessed area. The first lens device may be disposed in optical alignment with the image sensor. A second lens device, which may be adjustable (e.g., adjustable focal length), may be disposed between the first lens device and image sensor. The second lens may be positioned in the recessed area and/or coupled to the first lens device.

20 Claims, 7 Drawing Sheets

SCANNER CAMERA WITH PCB-INTEGRATED LENS HOLDER

BACKGROUND

Imaging or camera systems, such as barcode scanners and/or barcode readers, enable imaging of scenes and features within a scene. For example, the use of imaging systems to perform machine image capture of objects on which printed machine-readable indicia (e.g., barcodes, QR codes, etc.) are positioned may be used for product tracking, point-of-sale (POS) systems, and/or other logistics operations. Generally speaking, a barcode scanner or reader may include a camera system that images the printed machine-readable indicia a distance away from an object (e.g., product, container, pallet, parcel, etc.), and processor that decodes data (e.g., product codes) represented by the machine-readable indicia to identify information associated with the object (e.g., manufacturer, price, contents, weight, dimensions, etc.).

Camera devices or engines of standard camera systems typically include a support structure, such as a printed circuit board (PCB), an optical or image sensor, and a lens assembly to adjust image focus and to ensure sufficient image clarity for machine-readable indicia recognition and analysis. The lens assembly or device may include a focus lens and a lens holder to secure the lens to the support structure over the optical sensor. The lens holder secures a barrel within which the focus lens is held and shields the image sensor from external sideward light sources, and to mount the focus lens to the PCB. FIGS. 7A-7D depict conventional lens devices 700a-700d (collectively 700) inclusive of lens holders 702a-702d (collectively 702). As shown, the lens holders 702a-702d are bulky and must be aligned with other components of the camera system during assembly.

Figure 7A:
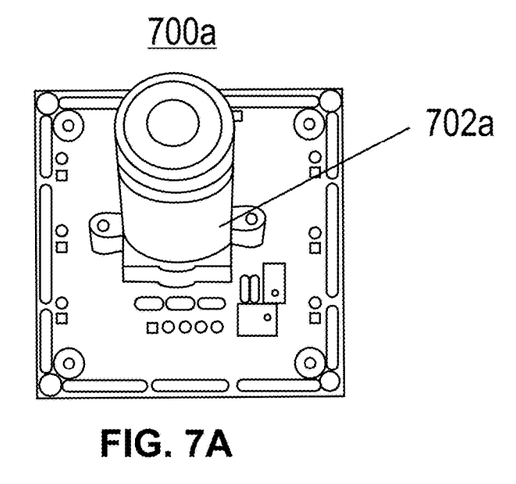
FIGS. 7A-7D depict conventional lens devices inclusive of lens holders.
Figure 7B:
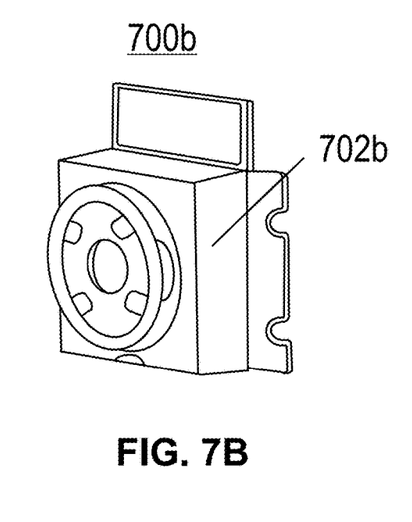
Figure 7C:
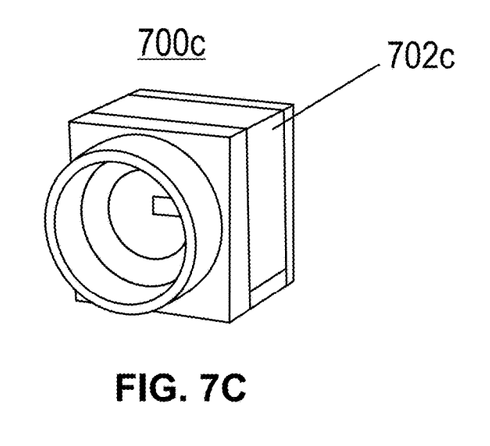
Figure 7D:
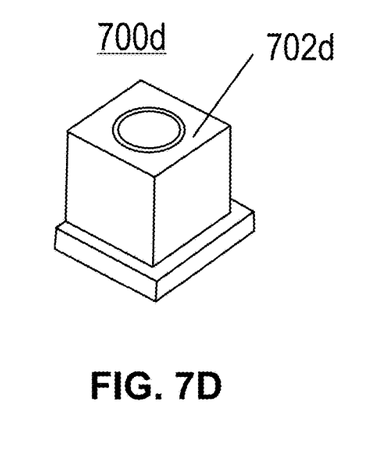

One challenge for production of such camera devices 700 and camera systems that utilize the camera devices 700 involves positioning the lens holders 702 in optical alignment with the optical sensors typically disposed on the PCB during production. The alignment operation may involve using a separate fixture to support a lens holder 702a, for example, in optical alignment with the optical sensor prior to securing the lens holder 702a to the support structure. The alignment operation may involve using fasteners, such as screws, to secure the lens holder 702a in place after alignment and to compress the lens holder 702a against the support structure to form electrical connections between the support structure and the lens holder 702a. Moreover, different fixture designs may be required for different lens sizes and shapes. As such, there is a need for lens devices that provide for faster, easier, and more accurate alignment and assembly.

BRIEF SUMMARY

To provide for easier assembly and more accurate alignment of a camera device in a camera system, such as barcode readers and other optical imaging systems, the camera device may include a support structure (e.g., printed circuit board) that also supports an image sensor (e.g., an optical sensor, etc.) of the camera device. The support structure of the camera device may include at least one printed circuit board (PCB) that defines the lens holder (a PCB-integrated lens holder). The camera device may further include the image sensor and at least one tunable or adjustable lens. The tunable or adjustable lens may be controlled by a controller. The adjustable lens may be supported by the PCB-integrated lens holder, and may be configured to focus light received by the lens onto the image sensor.

In an embodiment, the at least one PCB defines a lens holder of a camera device. For example, the PCB may define at least one recessed area or cavity having cylindrical sidewalls, where the recessed area(s) may define a PCB-integrated lens holder configured to receive an optical barrel of the lens device therein. The PCB-integrated lens holder may be configured to support an optical barrel of the lens device in optical alignment with the image sensor without using a separate lens holder, lens support, or other intervening components. In one embodiment, the lens device includes a fixed position lens with a fixed focal length. In another embodiment, in addition to fixed position lens, the lens device may include a tunable or adjustable lens capable of being adjusted for focusing an image on the image sensor.

By forming a PCB-integrated lens holder (e.g., a recessed area) defined by at least one PCB of a camera device that is configured to retain an optical barrel, the camera device does not need separate mechanical parts and fixtures to support the PCB-integrated lens holder in optical alignment with the image sensor during assembly. The PCB-integrated lens holder can also reduce the number of components, such as flexible PCB components and/or press-fit electrical connections, that are typically used to power and/or control the lens device, thereby reducing the overall size and weight of the camera device. Additionally, by using electrical conductors or other PCB-integrated pass-throughs for applying electrical power to the lens holder (for an adjustable or tunable lens), the PCB-integrated lens holder can increase reliability of the camera system, as these types of electrical connections are less susceptible to damage or control disruption resulting from vibration or other motions (e.g., mechanical shock from dropping the camera system).

One embodiment of the present disclosure relates to a camera device that includes at least one PCB, an image sensor, and a first lens device. The first lens device may include an optical barrel supporting a fixed position lens with a fixed focal length. In other embodiments, the first lens device includes a tunable or adjustable lens. The PCB(s) may define a recessed area having a mounting surface disposed therein. The image sensor may be disposed within the recessed area and be coupled to the mounting surface of the PCB(s). The first lens device may be coupled to the PCB(s) and may extend into the recessed area. The first lens device may be disposed in optical alignment with the image sensor. The camera device may further include a second lens device (e.g., tunable or adjustable lens) disposed and optically aligned between the first lens device and the image sensor.

Another embodiment of the present disclosure relates to a method of manufacturing an optical sensor. The method may include (i) positioning an image sensor within a recessed area that is defined by and extends into an outer surface of at least one PCB, (ii) coupling the image sensor to a mounting surface within the recessed area, and (iii) placing a first lens device into the recessed area of the PCB(s), and (iv) coupling the first lens device to the PCB(s) within the recessed area.

Yet another embodiment of the present disclosure relates to a camera system for use with a barcode reader or another imaging system. The camera system may include a housing and a camera device disposed within the housing. The housing may define a window. The camera device may include at least one PCB, an image sensor, and a first lens device. The PCB(s) may define a recessed area that is aligned with and faces the window. The image sensor may be disposed within the recessed area and coupled to the PCB(s). The first lens device may be coupled to the PCB(s) and may extend into the recessed area, and be disposed in optical alignment with the image sensor. A second lens device may be optically positioned between the first lens device and image sensor.

BRIEF DESCRIPTION OF THE FIGURES

Illustrative embodiments of the present invention are described in detail below with reference to the attached drawing figures, which are incorporated by reference herein and wherein.

DETAILED DESCRIPTION

Figure 1A:
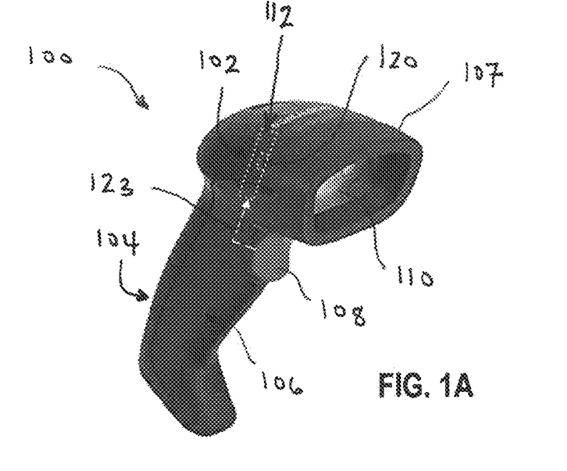
FIG. 1A is an illustration of an illustrative imaging system, in this case a handheld barcode scanner or reader that includes an illustrative housing and an illustrative camera device disposed therein.

Referring to FIG. 1A, an illustration of an illustrative imaging system 100 that includes an illustrative camera device 102 is shown. In the embodiment of FIG. 1A, the imaging system 100 is a handheld barcode reader (e.g., a scanner assembly, a barcode scanner, a 2D imager, etc.) for product code imaging and/or for object identification. The imaging system 100 may be part of a handheld imaging system that is configured to image and decode machine-readable indicia (e.g., barcodes, quick response (QR) codes, or other machine-identifiable indicia) from a distance away from an object, and to identify the object based on information decoded from the machine-readable indicia. For example, the imaging system 100 may be configured for use in a retail environment to image products and/or product packaging labels inclusive of machine-readable indicia for product identification and logistics (e.g., tracking) purposes. In other embodiments, the imaging system 100 may be used to facilitate other forms of interlogistics traceability. In other embodiments, the principles described herein may be integrated into a stationary optical system (e.g., a barcode reader system for a product conveyer system, etc.). There are many other examples of barcode reading systems. Moreover, the principles described herein may be applied to many other types of camera systems, including camera systems that are used to perform imaging without reading machine-readable indicia.

In the embodiment of FIG. 1A, the imaging system 100 includes a housing 104 and the camera device 102, which is disposed within the housing 104. In one embodiment, the housing 104 defines a housing body 106 configured to be held by a user and defining an inner cavity for containing, storing, and/or housing the camera device 102 and other components (e.g., processing circuitry, etc.) therein. The imaging system 100 may also include a user input device 108 (e.g., a push-button actuator, a trigger, etc.) that is coupled to or supported by the housing 104 and that is configured to selectively activate the camera device 102 or components thereof in response to user input. For example, the user input device 108 may be configured to activate the camera device 102 to capture an image of a product and/or product packaging label to read a machine-readable indicia disposed thereon. The user input device may alternatively be used to cause the imaging system to capture an image, start/stop capturing a sequence of images, or otherwise. It should be understood that the imaging system may be controlled remotely (e.g., wired or wireless), as well.

The housing 104 may define a housing head 107 that defines a window 110 (e.g., an opening, an aperture, etc. that frames and supports a transparent or other covering) that is optically aligned with at least a portion of the camera device 102. The window 110 may be optically aligned with an image sensor of the camera device 102 via a lens device (see FIG. 1B, for example) of the camera device 102 to collect light (e.g., a scene) via the window 110. In one embodiment, the window 110 of the imaging system 100 may be a transparent panel (e.g., a plexiglass panel, a glass panel, etc.) to shield and protect the components contained within the housing body 106 while enabling light to pass therethrough. In one embodiment, the imaging system 100 may also include at least one light element (e.g., a light emitting diode (LED), etc.) (not shown) that is positioned within the housing head 107 behind the window 110 to illuminate a target object (e.g., a product and/or product packing label, etc.). The light element(s) may be positioned elsewhere, as well, including being detachable.

The camera device 102 is disposed within the housing 104 (either the housing body 106 or housing head 107) and may be coupled to or restrained by the housing 104 or an internal structural member contained therein using screws, adhesive, or another type of fastener. The camera device 102 may be positioned within the housing 104 so that the image sensor and/or lens of the camera device 102 is in optical alignment with the window 110. In being an optical alignment, at least a portion of the light that enters the window 110 is incident on the camera device 102.

Figure 1B:
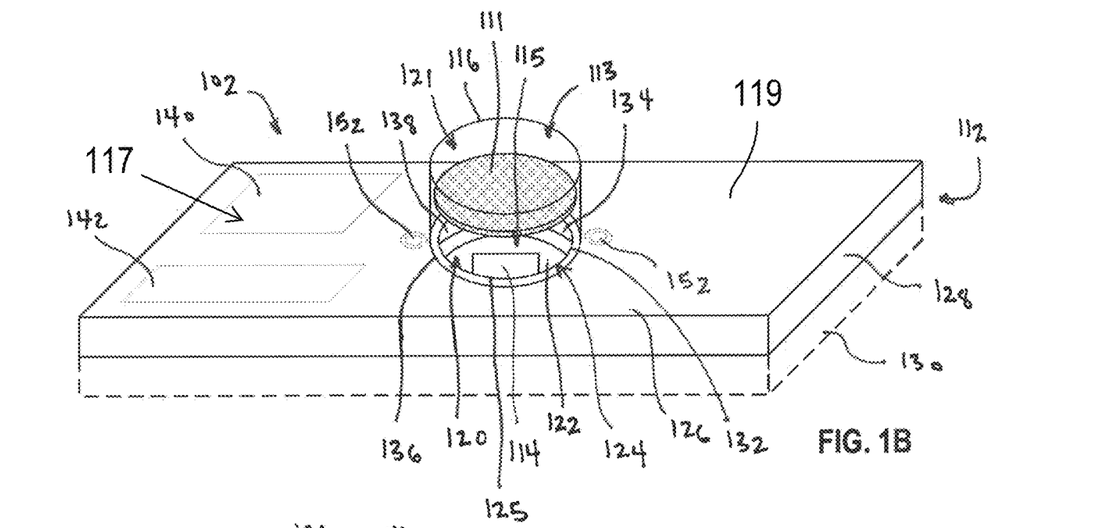
FIG. 1B is an isometric view of the illustrative camera device of FIG. 1A.

FIG. 1B is an illustration of an illustrative camera device 102 that may be used in the assembly of the imaging system 100 of FIG. 1A. The camera device 102 may be part of a camera system that includes at least one PCB 112, an image sensor 114, a lens device 116, and a controller 117. In other embodiments, the camera device 102 may include additional, fewer, and/or different components. The controller 117 and other electronics may alternatively be positioned on an opposite side of the PCB(s) 112 from the lens device 116, such as being disposed on an opposite side and aligned with the image sensor 114, thereby reducing size of the footprint of the camera device 102.

The PCB(s) 112 may be configured to function as a support structure for the camera device 102 and be configured to secure the image sensor 114, the lens device 116, and the controller 117 to the camera device 102. In other embodiments, the controller 117 may be located remotely (e.g., on a separate PCB, etc.) from the PCB(s) 112. In one embodiment, the PCB(s) 112 include at least one substrate 119 as well as electrical conductors 152 (e.g., pads, etc.), vias, wire traces, or other electrical connections embedded in or otherwise formed on the substrate(s) 119 that are used to electrically connect the electrical and/or electronic components of the camera device 102 conduct electrical power and electrical signals therebetween. The substrate(s) 119 may be a multi-layer substrate that includes multiple conductive layers that are embedded within the substrate(s) 119 that provide electrical connections for various components (e.g., controller 117) that are physically coupled to the PCB(s) 112 or positioned separate from the PCB(s) 112.

The PCB(s) 112 include and define a PCB-integrated lens holder 113 for the camera device 102 that is configured to (i) support the image sensor 114 and the lens device 116 in optical alignment therewith, and (ii) to set an axial spacing between the image sensor 114 and the lens device 116. The PCB-integrated lens holder 113 includes a recessed area 120 configured to physically support and restrain movement of a lens device, such as a lens device 116, thereby avoiding the need for a separate lens holder, as previously described. More specifically, in the embodiment of FIG. 1B, the PCB-integrated lens holder 113 includes a recessed area 120 defined by the PCB(s) 112 and having a mounting surface 122 disposed therein. The recessed area 120 defines a first opening 124 along and defined by an outer surface 126 of the PCB(s) 112, and a cavity 115 that extends from the first opening 124 to the mounting surface 122. In one embodiment, the profile of the first opening 124 is circular. Alternatively shaped profiles may be utilized. The recessed area 120 may be formed in a cylindrical shape that extends vertically from the first opening 124 to the mounting surface 122. In other embodiments, the shape of the first opening 124 and/or the recessed area 120 may be different. For example, the wall(s) of the recessed area 120 may be layered (e.g., on or more shelves), angled, or have any other shape or profile(s).

In the embodiment of FIG. 1A, the PCB(s) 112 are positioned within the housing body 106 of the imaging system 100 so that the recessed area 120 is aligned with and faces the window 110 of the imaging system 100 (so that light from the window 110 is directed through the first opening 124).

In the embodiment of FIG. 1B, the PCB(s) 112 include a first PCB 128 (e.g., a lens holder PCB, a frame PCB, etc.) and a second PCB 130 (e.g., a base PCB, an image sensor support PCB, etc.) that is coupled to the first PCB 128. The first PCB 128 and the second PCB 130 are planar sheets of a substrate that are arranged in parallel and connected to one another. In an embodiment, the first PCB 128 may be soldered to the second PCB 130. The first PCB 128 and the second PCB 130 may be glued or otherwise adhered to or connected to one another. The first PCB 128 may define a through-hole opening 132 that defines a cylindrically-shaped sidewall of the recessed area 120. The second PCB 130 encloses an end of the through-hole opening 132 opposite from the first opening 124. The second PCB 130 defines the mounting surface 122 at the closed end of the recessed area 120. In other embodiments, the recessed area 120 may be defined by a single PCB panel by an etching or a counterbore operation so that a single substrate (a substrate formed from a single piece of material as a monolithic body) defines both the sidewall and the mounting surface 122 of the recessed area 120. It should be appreciated that the thickness and material of the first PCB 120 and the second PCB 130 may vary depending on application specifications.

The image sensor 114 may be configured to capture images and output image data used to form an image, generally a digital image. In the embodiment of FIG. 1B, the image sensor 114 is disposed within the recessed area 120 and is coupled to the mounting surface 122. In one embodiment, the image sensor 114 is coupled to the mounting surface 122 using surface mount technology (SMT) by directly soldering the image sensor 114 to the mounting surface 122 (e.g., by electrically connecting the image sensor 114 to wire traces, pads, and/or electrical conductors on a surface of the PCB(s) 112). In the embodiment of FIG. 1B, the image sensor 114 extends substantially parallel to the mounting surface 122 and extends across (e.g., covers) a substantial portion of the mounting surface 122. The image sensor 114 may include one or more of a charge-coupled device (CCD), an active-pixel sensor (CMOS), or another form of electro-optical image sensor, and typical electronic boundary components. The resolution of the image sensor 114 may vary based on application specifications.

Figure 1C:
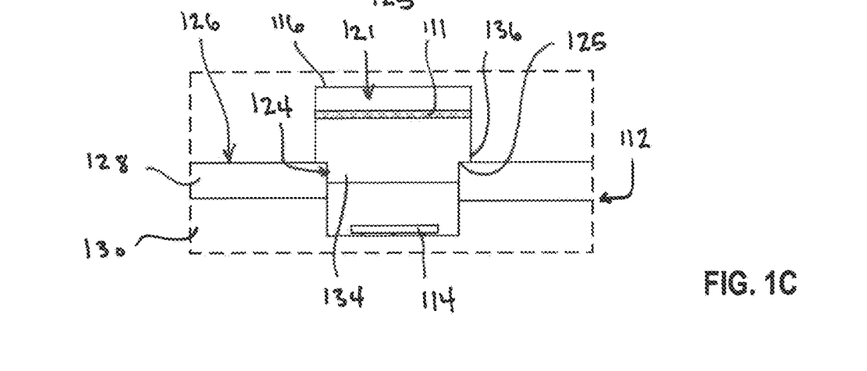
FIG. 1C is a side cross-sectional view of the illustrative camera device of FIG. 1A.

Referring to FIGS. 1B and 1C, the lens device 116, which may include a lens body 134, such as an optical barrel 121, or another type of optical support having one or more lenses 111 that are coupled to or supported by the lens body 134. The lens device 116 may be configured to focus light (e.g., light that is reflected from a target object on which machine-readable indicia are located, etc.) and to direct the focused light towards the image sensor 114. In the embodiment of FIG. 1B, the lens device 116 is coupled to the PCB(s) 112 and extends into the recessed area 120. In the embodiment of FIG. 1B, the image sensor 114 is connected to the first PCB 128 and the lens device 116 is coupled to the second PCB 130. The lens(es) 111 may be fixed position lens(es) having a fixed focal length or adjustable lens(es) that are adjustable to vary the focal length.

The lens device 116 is engaged with or otherwise coupled to the PCB(s) 112 adjacent to a perimeter edge 125 of the first opening 124. For example, the lens device 116 may include a lens body 134 and a projection 136 extending radially away the lens body 134 at an intermediate axial position along the lens body 134. The projection 136 may extend in a circumferential direction along an entire outer perimeter of the lens body 134. In one embodiment, the projection 136 defines an L-shaped ledge that is configured to engage the outer surface 126 of the PCB(s) 112 in a region that circumscribes the perimeter edge 125 of the first opening 124.

The PCB(s) 112 may be structured to position and orient the lens device 116 in optical alignment with the image sensor 114. In the embodiment of FIG. 1B, the lens device 116 is nestably engaged with the recessed area 120. A portion 138 (e.g., an axial end portion) of the lens device 116 (e.g., the lens body 134) extends axially into the recessed area 120 so that the portion 138 is disposed within the cavity 115 of the recessed area 120. Engagement between an outer radial sidewall of the portion 138 and the sidewall of the recessed area 120 may prevent radial movement of the lens device 116 relative to the image sensor 114. The cavity 115 of the PCB(s) 112 functions as a camera lens holder for the camera device 102 in supporting the lens device 116 to channel light through to the image sensor 114 and shield the image sensor 114 from sideward or peripheral light. In an embodiment, the recessed area 120 may have feature(s) that may be engaged by reciprocal feature(s) on the portion 138 of the lens device 116, such as threads, projection(s) protrusion(s), or other engagement or locking features.

In one embodiment, the lens device 116 is configured to receive and focus the light entering the imaging system 100 (see FIG. 1A) through the window 110 to enable clear imaging of the target object (e.g., to reduce blurriness of the target object, barcode, etc.). The lens device 116 may include a barrel lens 111 disposed within an optical barrel 121 (e.g., a lens body, a casing, a lens housing, etc.), and a support structure, such as the circumferential projection 136 to engage and couple the lens device 116 to the PCB 112. The optical component(s) (e.g., the optical barrel 121) of the lens device 116 may include, for example, one or more fixed lenses with fixed focal lengths. In another embodiment, the optical component(s) of the lens device 116 include a focus lens and/or an iris and/or a zoom optical component that is physically adjustable. In other embodiments, the lens device 116 may include a different type of lens-PCB interface feature and/or may be a custom designed lens, such as a dynamic focus lens, or another lens type, such as a zoom lens.

The controller 117 may be part of an electronic control system that is configured to power and/or control the image sensor 114 and/or the lens device 116. The controller 117 may include a processor 140 disposed within the housing 104 and a memory 142 storing machine-readable instructions thereon that, when read, cause the processor 140 to perform operations such as capturing an image using the image sensor 114 and/or adjusting focus and/or zoom of the lens device 116 or another adjustable lens device (see FIGS. 2-4, for example). In some embodiments, the processor 140 is communicatively coupled to the user input device 108 and is configured to control activation of the image sensor 114 illumination device (not shown), and/or the lens device 116, if actively controllable, in response to an input signal 123 from the user input device 108 to capture an image through the window 110 of the imaging system 100. In some embodiments, the controller 117 is coupled to the PCB(s) 112, such as to the outer surface 126 of the PCB(s) 112. In other embodiments, the controller 117 may be mounted within the housing 104 separately/remotely from the PCB(s) 112. It should be appreciated that the geometry and arrangement of the PCB(s) 112 and/or other components of the camera device 102 may be different in various embodiments.

Figure 2:
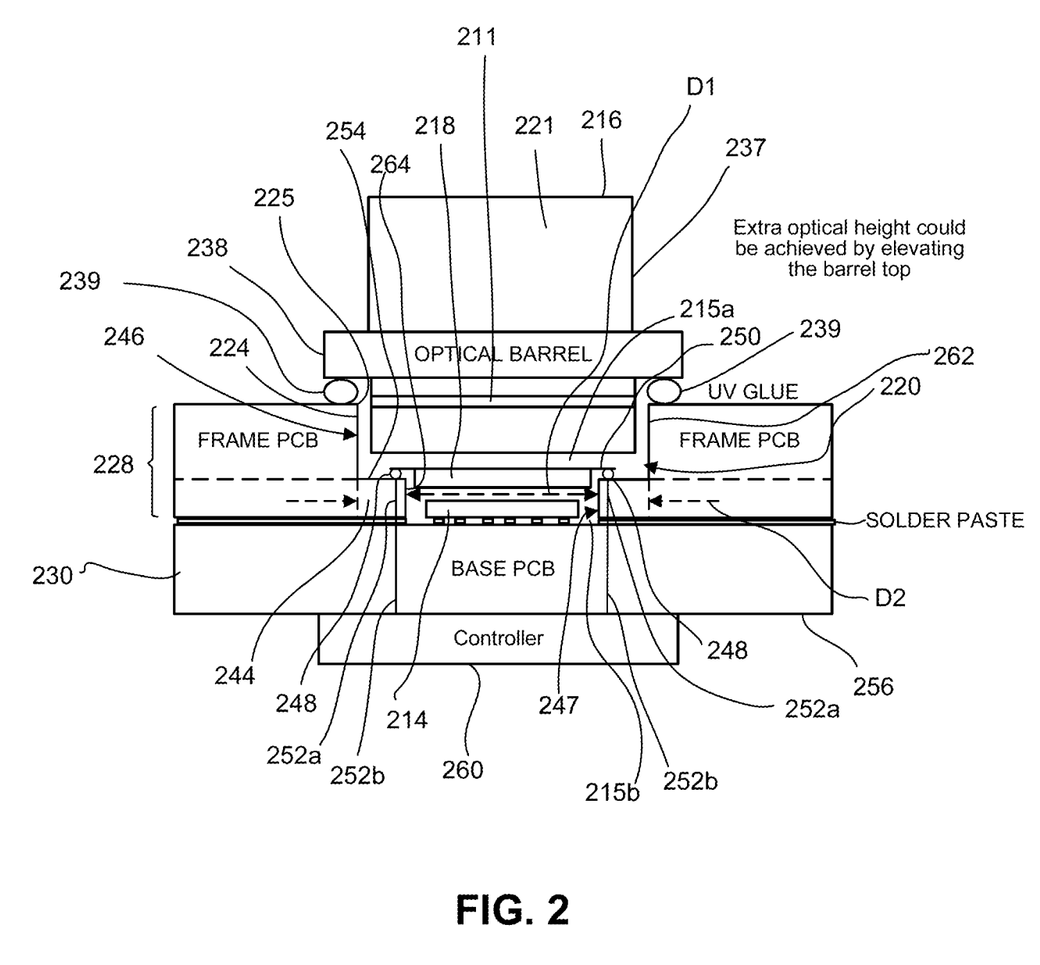
FIG. 2 is a side cross-sectional view of an illustrative camera device inclusive of a PCB-integrated lens holder having a lens holder PCB and a base PCB, and configured to support one or more lens devices.

Referring to FIG. 2, another illustrative camera device 202 for use with an imaging system (e.g., a barcode scanning device, etc.) is shown. The camera device 202 has a similar design as the camera device 102 of FIG. 1B, but includes multiple lens devices, shown as a first lens device 216, which may be a fixed focal length lens, and a second lens device 218, which may be an adjustable focal length lens to enable a lens driver or controller 260 to adjust an adjustable lens of the second lens device 218, thereby adjusting image focus. In the embodiment of FIG. 2, the first lens device 216 includes a lens body including an optical barrel 221, and at least one lens 211. The optical barrel 221 includes a radial projection 238 that extends over and engages (e.g., directly or indirectly coupled) an upper surface 240 of a first or frame PCB 228. The radial projection 238 engages the upper surface of the first PCB 228 in a region that is adjacent to a perimeter edge 225 of a recessed area 220 defined by the first PCB 228 and a second PCB 230 (in a region that extends radially outwardly from the perimeter edge 225 of the recessed area 220). The first and/or second PCBs 228 and 230 may have multiple layers for including trace lines for routing signals from the image sensor 214. A height of the recessed area 220 sets a focal distance between lens(es) 211 in the optical barrel 221 and the image sensor 214. It should be appreciated that extra optical height 246 between the optical barrel 221 and the image sensor 214 can be achieved by increasing height of a barrel top portion 237 extending from the radial projection 238 of the optical barrel 221 of the first lens device 216. In one embodiment, the first lens device 216 is coupled to the first PCB 228 using a curable adhesive product 239, such as an ultraviolet (UV) light adhesive product (e.g., UV glue) that is cured by irradiation from a UV light source. Although shown as two "dots," the curable adhesive product 239 may extend continuously around the recessed area 220 on an upper surface 240 of the first PCB 228.

In one embodiment, the second lens device 218 is an adjustable or tunable lens device (e.g., a tunable lens having variable focal length, etc.) that can be electromechanically controlled to change light passing through the second lens device 218 or another optical characteristic of light transmitted by the second lens device 218 to focus on an image sensor 214 of the camera device 202. In one embodiment, the second lens device 218 is a piezoelectric, electrically actuated lens having an adjustable diopter based on a voltage difference applied to the second lens device 218. Other electromechanical and/or electro-optical adjustable lens(es) may be utilized to provide the same or similar function as the second lens device 218.

In the embodiment of FIG. 2, the second lens device 218 is supported by the first PCB 228 within the recessed area 220 (e.g., within an upper cavity 215a that is defined by the recessed area 220). The first PCB 228 and the second PCB 230 together are structured to support the second lens device 218 in optical alignment with the image sensor 214 and the first lens device 216. As shown, the second lens device 218 is arranged coaxially with respect to the image sensor 214. In one embodiment, the second lens device 218 is disposed axially between the image sensor 214 and the first lens device 216. A lower cavity 215b may be axially disposed below the upper cavity 215a and have a smaller diameter (D1) than a diameter (D2) of the upper cavity 215a.

The first PCB 228 defines a shelf 244 that is disposed within the recessed area 220. The shelf 244 extends radially inward from a wall surface 246 (e.g., a cylindrical sidewall, etc.) that is defined by the recessed area 220 of the first PCB 228 and establishes the diameter (D1) of the lower cavity 215b. The shelf 244 is spaced axially apart from a first opening 224 of the recessed area 220 at an outer end of the recessed area 220. As described above, the shelf 244 may be a protrusion and/or ledge that extends radially inwardly into the recessed area 220 so as to define the upper cavity 215a and axially away from a closed end of the recessed area 220 as defined by the second PCB 230. In the embodiment of FIG. 2, the shelf 244 is a ledge defining a second opening 247 that is concentric with a first opening 224 located at the outer end of the recessed area 220.

The second lens device 218 may be directly or indirectly coupled to a top surface 254 of the shelf 244 that faces axially toward the first opening 224. In at least one embodiment, the recessed area 220 includes a first internal surface 262 extending axially from the first opening 224 to the shelf 244, and a second internal surface 264 extending axially between the second opening 247 and a mounting surface 222. In one embodiment, a height of the shelf 244 (e.g., the second internal surface 264) is greater than a height of the image sensor 214. In another embodiment, the height of the shelf 244 is greater than a combined height of the image sensor 214 and the second lens device 218 (the adjustable lens device).

The second lens device 218 may be directly or indirectly coupled to the shelf 244 by an electrically conductive adhesive 248, such as an electrically conductive glue or epoxy. Among other reasons, using the electrically conductive adhesive 248 to secure the second lens device 218 to the shelf 244 can (i) increase the reliability of electrical connections between the second lens device 218 and the controller 260 of the camera device 202, and (ii) provide resilience of the connection against failure due to vibrational loading (e.g., as a result of being dropped). Using the electrically conductive adhesive 248 also allows for the use of optical lenses based on plastic materials instead of high-temperature resistant glass, which may be utilized if the components of the lens device or a separate lens holder are soldered to the PCB. In other embodiments, the second lens device 218 may be soldered directly to the first PCB 228 at the shelf 244 by conductive leads 250 that extend radially away from the second lens device 218. The conductive leads 250 may be applied to a rigid or flexible component of the second lens device 218.

Continuing with FIG. 2, the second lens device 218 may be electrically connected to electrical conductors 252 (e.g., an electrical via) by the electrically conductive adhesive 248. In one embodiment, the conductive adhesive 248 is a conductive glue, such as a silver epoxy adhesive or another electrically conductive adhesive having a volume resistivity of less than or equal to approximately 3×10−5 ohm-cm. Other conductive adhesives with different volume resistivity may be utilized. Moreover, other techniques for electrically attaching the second lens device 218 to the electrical conductors 252 may be utilized. In one embodiment, the electrical connection(s) 252a, 252b extend through the first PCB 228 (by connection 252a) and the second PCB 230 (by connection 252b) from the top surface or first outer side 254 of the first PCB 228 to a second outer side 256 of the second PCB 230 that is opposite the first outer side 254. The connections 252a, 252b may be electrically connected to one another by a solder paste that connects the first PCB 228 to the second PCB 230. The electrical connection(s) (e.g., the connection 252b as shown in FIG. 2) may extend through the second PCB 230 so as to connect to the controller 260 disposed on the second outer side 256 of the second PCB 230. In one embodiment, the electrical conductor(s) 252 may be disposed proximate to an inner perimeter surface 258 (e.g., the second internal surface) of the recessed area 220 that extends axially through the first PCB 228.

In the embodiment of FIG. 2, the camera device 202 includes the two electrical conductors 252 that extend axially through the shelf 244 and the second PCB 230. The electrically conductive adhesive 248 provides both an electrical connection to the electrical conductors 252 as well as a mechanical connection securing the second lens device 218 to the first PCB 228 (e.g., on the upper surface 254 of the shelf 244).

In one embodiment, as shown in FIG. 2, the camera device 202 includes a lens driver or the controller 260 coupled to the second PCB 230, in this case the second outer side 256 of the second PCB 230, that is configured to power and control operation of the second lens device 218 and/or the first lens device 216, if active elements are functioning therein. The electrical conductor(s) 252 may be power conductors (e.g., electrical conductors capable of applying up to 60V DC or higher differential or absolute across the second lens device 218, etc.). The controller 260 may also be configured to provide control signals through the electrical conductor(s) 252 (or other electrical conductors) to control operations of the second lens device 218.

Because the controller 260 is mounted to the second outer side 256 of the second PCB 230 as the recessed area 220, the controller 260 is spaced axially apart from the image sensor 214 by the second PCB 230. In another embodiment, the controller 260 is mounted to another surface of the first PCB 228 or the second PCB 230 (e.g., a surface in which the recessed area 220 is formed, the top surface of the first PCB 228, etc.).

The mounting arrangement of the second lens device 218 may be different in various embodiments. For example, referring to FIG. 3, an illustrative camera device 302 is shown that includes a second lens device 318 (e.g., an adjustable lens device, a tunable lens, etc.) that is directly coupled to or integrated into a first lens device 316 (e.g., a lens device having fixed or variable focal length, etc.). The first and second lens devices 316 and 318 may be coupled to the first PCB 328 and/or the second PCB 330 of the camera device 302. In such an embodiment, the recessed area 320 defined by the first PCB 328 and the second PCB 330 may include a single, vertical sidewall extending in an axial direction from a first opening 324 of the first PCB 328 to a mounting surface 322 of the recessed area 320. As with FIG. 2, if the optical barrel of the first lens device 316 has a circular profile, then the profile of the recessed area 320 may have a circular profile.

Figure 3:
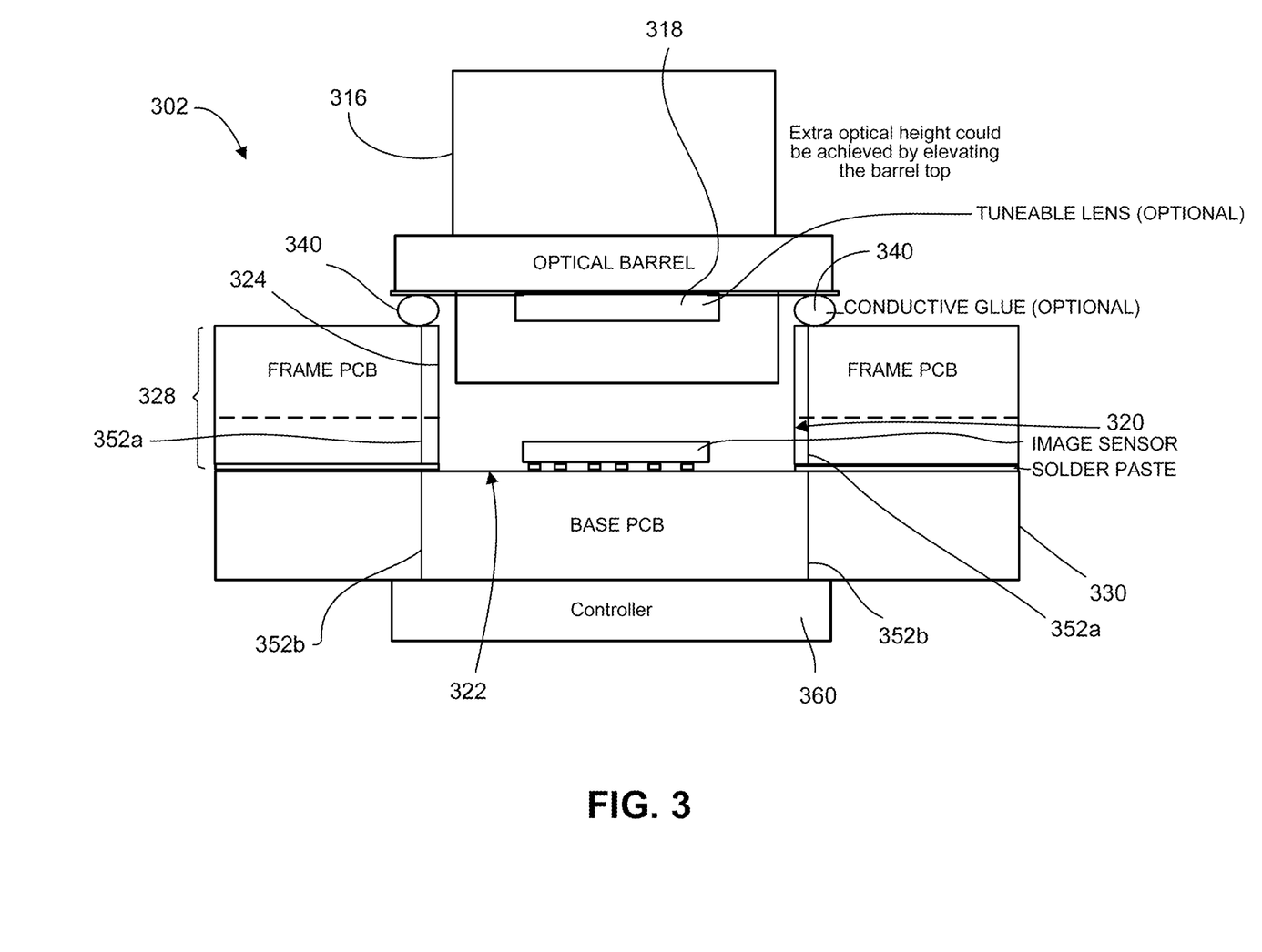
FIG. 3 is a side cross-sectional view of an illustrative camera device inclusive of a PCB-integrated lens holder supporting one or more lens devices disposed in a lens barrel, for example.

The second lens device 318 and/or the first lens device 316 may both be electrically coupled to electrical connection (s) 352a, 352b by an electrically conductive adhesive 340. The electrical connection(s) 352a, 352b may be the same as or similar to the electrical connection(s) 252a, 252b described with reference to FIG. 2. In the embodiment of FIG. 3, the electrical conductors 352 extend axially through an entirety of the first PCB 328 and the second PCB 330, thereby enabling electrical power and/or data signals to control the second lens 318 by controller 360 with internal electrical conductors 352 so as to simplify assembly of the camera device 302.

Figure 4:
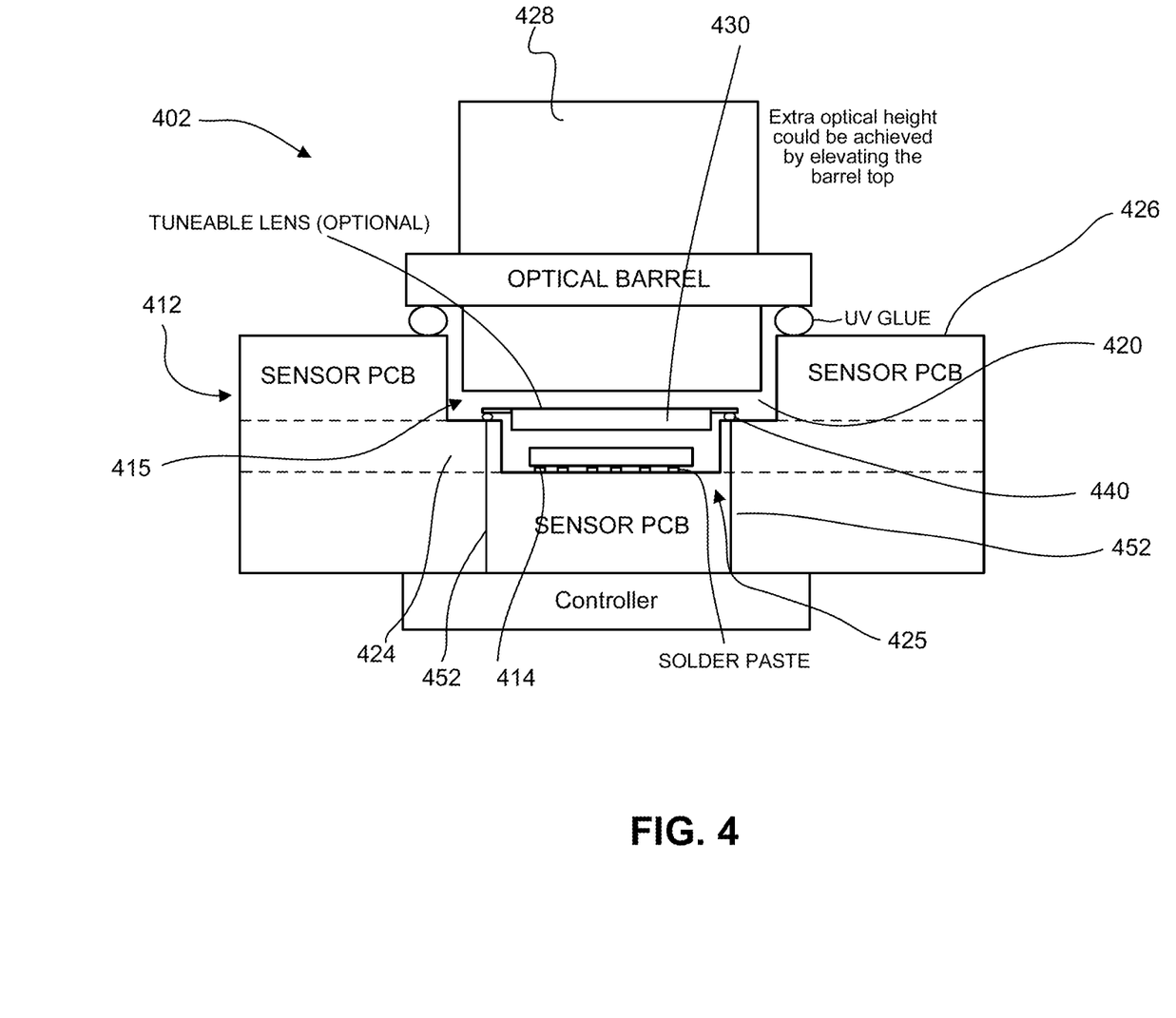
FIG. 4 is a side cross-sectional view of an illustrative camera device inclusive of a PCB-integrated lens holder formed from a single PCB.

FIG. 4 is an illustration of another embodiment of an illustrative camera device 402 having first and second lens devices 428 and 430 and an image sensor 414 that are arranged similarly to the camera device 202 of FIG. 2. In this embodiment, PCB 412 is a single PCB panel that is formed of a single-piece, monolithic substrate (instead of multiple substrates that are soldered or otherwise coupled together). The camera device 402 includes a recessed area 420 that is etched or otherwise formed into an outer surface 426 (e.g., a top surface) of the PCB 412. The PCB 412 also includes a shelf 424 protruding radially inward at a closed end 425 of the recessed area 420 for supporting (e.g., suspending) second lens device 430 within a cavity 415 of the recessed area 420 and in a position axially between the first lens device 428 and the image sensor 414. The camera device 402 also includes electrical connection(s) 452 that extend through the PCB 412. The second lens device 420 may be electrically connected to the electrical connection(s) 452 using an electrically conductive glue 440.

Figure 5:
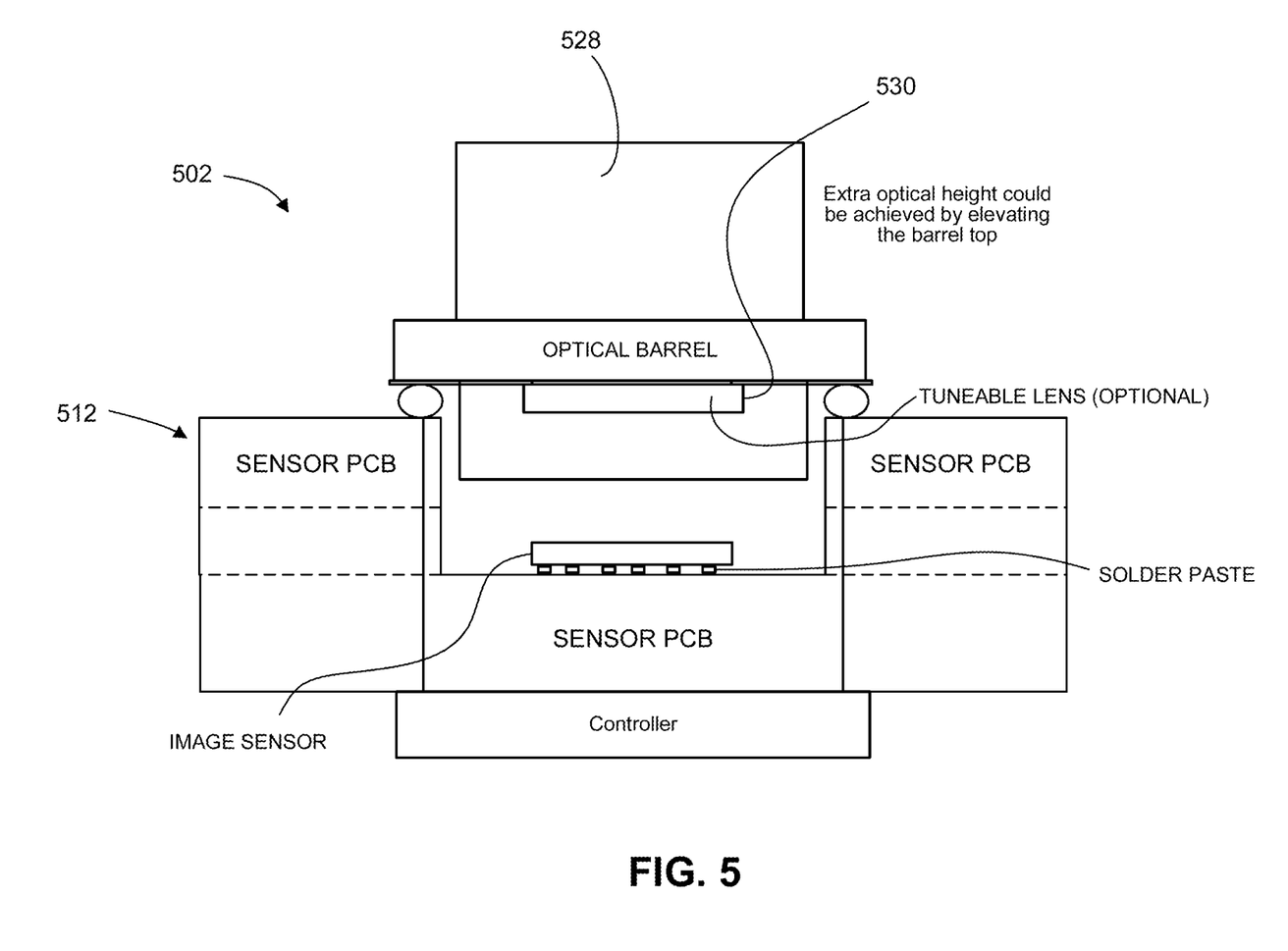
FIG. 5 is a side cross-sectional view of an illustrative camera device inclusive of a PCB-integrated lens holder formed from a single PCB, and a tunable lens that is integrated with an optical barrel of a first lens device.

FIG. 5 is an illustration of another illustrative camera device 502 that is made from a single PCB 512. The camera device 502 includes a second lens device 530 that is integrated into (e.g., coupled directly to, etc.) a first lens device 528, similar to the arrangement described with respect to FIG. 3, which was formed with multiple PCBs, including the first PCB 328 and the second PCB 330.

It should be appreciated that the dimensions of the PCB integrated lens holder (e.g., the recessed area, the shelf, etc.) described with respect to any of the foregoing embodiments may be different than those shown and may be tailored to the size of the lens device(s) and image sensor being used.

Alternative PCB-integrated lens holders may be utilized to provide the same or similar function.

Figure 6:
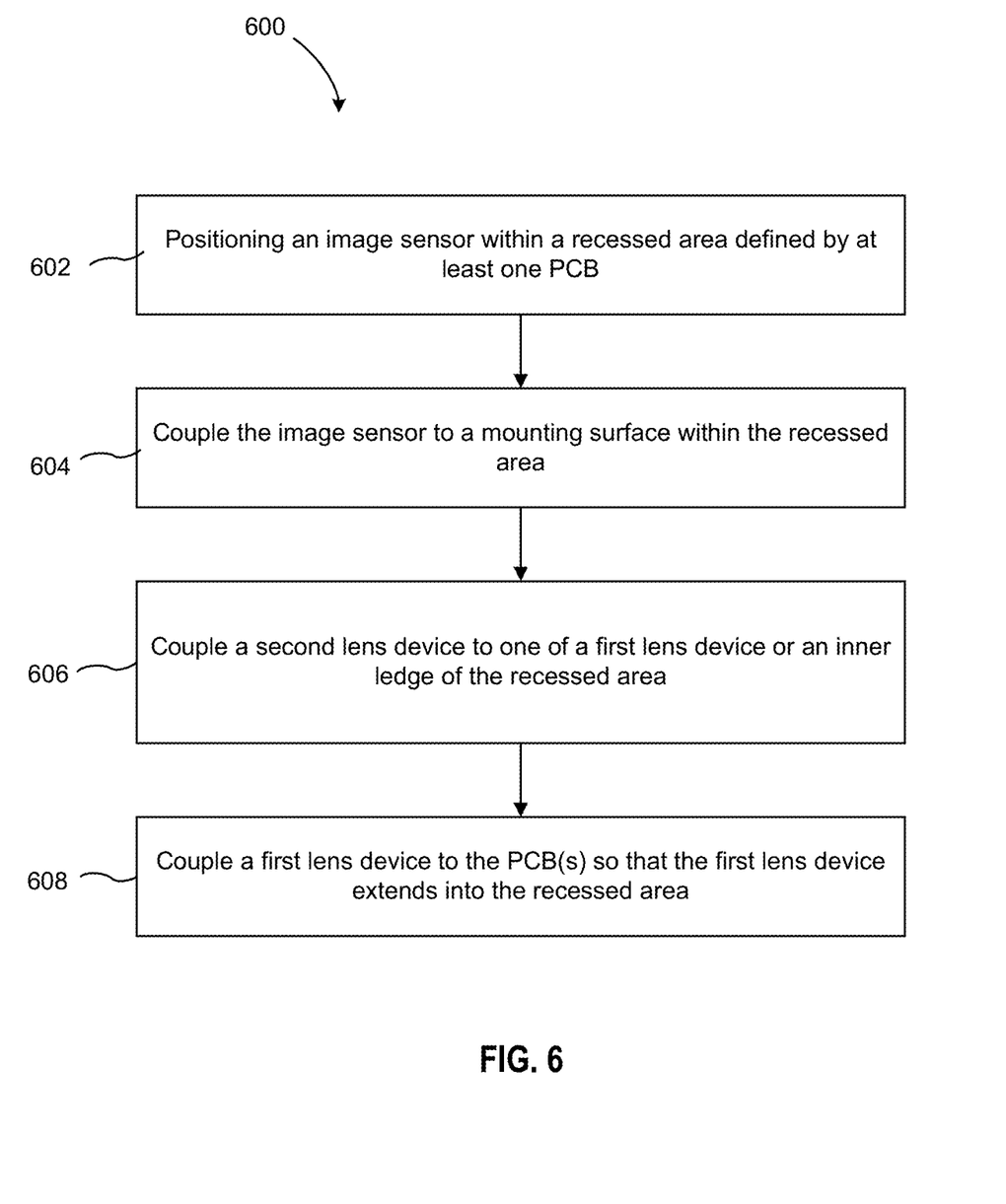
FIG. 6 is a flow diagram of an illustrative method of manufacturing a camera device and a PCB-integrated lens holder.

Referring to FIG. 6, a flow diagram of an illustrative method 600 of making a camera device is shown, such as any of the camera devices described with reference to FIGS. 1A-1B or FIGS. 2-5. In other embodiments, the method 600 may include additional, fewer, and/or different operations.

Operation 602 may include positioning an image sensor within a recessed area defined by at least one PCB. In one embodiment, operation 602 may include forming the recessed area into the PCB(s) by etching, machining, or otherwise forming the recessed area in a PCB substrate. Operation 602 may include etching the recessed area into a single PCB substrate (see, for example, FIG. 4). In other embodiments, operation 602 may include etching or drilling a through-hole opening through a first PCB and soldering or otherwise coupling the first PCB to a second PCB to enclose one end of the through-hole opening (see, for example, FIG. 3). In such embodiments, operation 602 may include aligning at least one corner of the first PCB with at least one corner of the second PCB, or by using standard surface mount technology (SMT) processes to ensure precision of alignment between the first PCB and the second PCB.

Operation 602 may further include stenciling solder with a mask to solder the first PCB to the second PCB and to electrically connect conductors from the first PCB to the second PCB. For example, operation 602 may include electrically connecting a first electrical conductor of the first PCB that extends through the first PCB to a second electrical conductor that extends through the second PCB. In other embodiments, operation 602 includes bonding the first PCB to the second PCB using an electrically conductive adhesive. The first and second electrical conductors may be disposed proximate to the recessed area to enable one or more electrically powered lens devices to be powered and controlled when positioned in or at the recessed area. If two or more PCBs are used for the camera device, electrical conductor pads (e.g., copper pads), connectors, or other junction structures may be applied to the opposing sides of the PCBs and electrically connected to respective electrical conductors, thereby electrically connecting the electrical conductors to one another.

In one embodiment, operation 602 includes positioning the image sensor within the recessed area and engaging the image sensor with a mounting surface at the closed end of the recessed area. In some embodiments, operation 602 includes using SMT processes to align and place the image sensor on the mounting surface within the recessed area.

Operation 604 may include coupling an image sensor to the mounting surface within the recessed area. In one embodiment, operation 604 includes soldering or otherwise electrically connecting the image sensor to electrical conductors disposed along the mounting surface, such as the electrical conductors that extend through the first PCB and the second PCB.

Operation 606 optionally may include coupling a second lens device (e.g., an adjustable lens device, a tunable lens, etc.) to one of a first lens device (e.g., a lens device having fixed focal length, etc.) (see FIGS. 3 and 5) or an inner ledge of the recessed area (see FIGS. 2 and 4). Rather than coupling a second lens device to a first lens device, a first lens device inclusive of a second lens device may be selected and assembled to the camera device. In one embodiment, operation 606 includes placing the second lens device into the cavity defined by the recessed area. Operation 606 may include optically aligning the second lens device with the image sensor, for example, by engaging the second lens device (e.g., electrical terminals of the second lens device) with a shelf extending radially inward toward a central axis of the recessed area. Operation 606 may include bonding the second lens device to the shelf, and the electrical conductors positioned along an axially-facing surface of the shelf using an electrically conductive adhesive or solder to supply electrical power and/or signals for controlling the second lens. In other embodiments, operation 606 includes directly connecting the second lens device to a first lens device that is configured to engage with and mount to the recessed area. It should be understood that the second lens device may be attached to and electrically connected to the first lens device or to the PCB(s) based on a configuration thereof.

Operation 608 may include coupling the first lens device to the at least one PCB so that the first lens device extends into the recessed area. In one embodiment, operation 608 includes optically aligning the first lens device with the image sensor and/or the second lens device. Operation 608 may include engaging the first lens device with the recessed area of the PCB(s) by inserting an optical barrel or another first portion of the first lens device into the recessed area and engaging a radial protrusion or another second portion of an optical barrel of the first lens device with an outer perimeter surface of the PCB(s) proximate to a perimeter edge of the recessed area (see, for example, FIGS. 2-5). Operation 608 may include positioning the first lens device and/or the second lens device so that the second lens device is disposed axially between the first lens device and the image sensor. Operation 608 may include bonding or otherwise coupling the first lens device to the PCB(s), for example, using a curable UV adhesive material. In such implementations, operation 608 may include using a focalization device and/or machine to ensure proper focal length between the image sensor and the first lens device after installation. Operation 608 may include recording an image from the sensor in a first position, when the optical distance/point is established between the first lens device and the image sensor, supporting the first lens device in the first position, and curing the curable UV adhesive to secure the first lens device in the first position by irradiating the UV adhesive with UV light.

The principles described herein provide for a low-cost solution for camera devices and supports high miniaturization for use in camera systems. Installing the camera device described herein supports installation of the camera device with no additional mechanical parts to hold the PCB-integrated lens holder in place as the PCB(s) are already installed in a camera system. Moreover, existing lens holder alignment processes may be avoided because an image sensor and the PCB-integrated lens holder are intrinsically aligned by construction (i.e., the image sensor is mounted to a surface of the PCB within the PCB-integrated lens holder in which a lens barrel of a lens device of the camera device is mounted. An optional, simplified electro-mechanical connection is possible with a tunable lens that may be disposed in the PCB-integrated lens holder or with the lens device by configuring the PCB with through-hole electrical conductors from a controller disposed on a side opposite the lens device. The principles of the camera device described herein further provide for lower manufacturing costs, smaller camera modules, and smaller scan engines for use in code scanners.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A camera device, comprising:
   at least one printed circuit board (PCB) defining a recessed area having a mounting surface therein;
   an image sensor disposed within the recessed area and coupled to the mounting surface;
   a first lens device coupled to the at least one PCB and extending into the recessed area, the first lens device disposed in optical alignment with the image sensor; and
   a second lens device disposed axially between the image sensor and the first lens device.

2. The camera device of claim 1, wherein the second lens device is an adjustable lens device.

3. The camera device of claim 2, further comprising a lens driver coupled to the at least one PCB, the lens driver configured to power and control the adjustable lens device.

4. The camera device of claim 3, wherein the lens driver is mounted to an opposite side of the at least one PCB as the recessed area.

5. The camera device of claim 4, further comprising at least one electrical conductor extending through the at least one PCB and electrically connected to the lens driver and the adjustable lens device.

6. The camera device of claim 5, wherein the adjustable lens device is electrically coupled to the at least one electrical conductor by an electrically conductive adhesive.

7. The camera device of claim 1, wherein the first lens device is a barrel lens.

8. A camera device comprising:
   at least one printed circuit board (PCB) defining a recessed area having a mounting surface therein;
   an image sensor disposed within the recessed area and coupled to the mounting surface; and
   a first lens device coupled to the at least one PCB and extending into the recessed area, the first lens device disposed in optical alignment with the image sensor, wherein the at least one PCB includes a first PCB and a second PCB connected to the first PCB, the image sensor connected to the first PCB and the first lens device connected to the second PCB.

9. A camera device comprising:
   at least one printed circuit board (PCB) defining a recessed area having a mounting surface therein;
   an image sensor disposed within the recessed area and coupled to the mounting surface; and
   a first lens device coupled to the at least one PCB and extending into the recessed area, the first lens device disposed in optical alignment with the image sensor, wherein the recessed area defines a first opening along an outer surface of the at least one PCB, the at least one PCB further defining a shelf disposed within the recessed area that extends radially inward from a wall surface defined by the recessed area, the shelf defining a second opening that is concentric with the first opening.

10. The camera device of claim 9, further comprising a second lens device coupled to the shelf,
    whereas the second lens device is an adjustable lens device, and
    wherein the second lens device includes electrical conductors,
    further comprising electrical conductors of the second lens device are electrically coupled.

11. A method of manufacturing a camera device, comprising:
- positioning an image sensor within a recessed area defined along an outer surface of at least one PCB;
- coupling the image sensor to a mounting surface within the recessed area;
- extending a first lens device into the recessed area;
- coupling the first lens device to the at least one PCB within the recessed area; and
- coupling a second lens device within the camera device so that the second lens device is disposed axially between an optical barrel of the first lens device and the image sensor.

12. The method claim 11, further comprising coupling the second lens device to a shelf that is disposed within the recessed area that extends radially inward from a wall surface defined by the recessed area.

13. A method of manufacturing a camera device, comprising:
- positioning an image sensor within a recessed area defined along an outer surface of at least one PCB;
- coupling the image sensor to a mounting surface within the recessed area;
- extending a first lens device into the recessed area;
- coupling the first lens device to the at least one PCB within the recessed area; and
- forming the recessed area in the at least one PCB by coupling a first PCB to a second PCB, the first PCB defining an opening extending therethrough, the first PCB including a first electrical conductor extending through the first PCB proximate to the opening, wherein coupling the first PCB to the second PCB includes electrically connecting the first electrical conductor to a second electrical conductor that extends through the second PCB.

14. A camera system, comprising:
- a housing defining a window;
- a camera device disposed within the housing, the camera device including:
  - at least one PCB defining a recessed area, the recessed area aligned with and facing the window;
  - an image sensor disposed within the recessed area and coupled to the at least one PCB;
  - a first lens device coupled to the at least one PCB and extending into the recessed area, the first lens device disposed in optical alignment with the image sensor;
- a user input device coupled to the housing; and
- a processor disposed within the housing, the processor communicably coupled to the user input device and the image sensor, the processor configured to control activation of the image sensor in response to an input signal from the user input device to capture an image through the window of the housing.

15. The camera system of claim 14, further comprising a second lens device disposed axially between the image sensor and the first lens device.

16. The camera system of claim 15, wherein the second lens device is an adjustable lens device, further comprising a lens driver coupled to the at least one PCB, the lens driver configured to power and control the adjustable lens device.

17. The camera system of claim 14, wherein the camera system is an assembly of a barcode reading device.

18. The camera system of claim 17, wherein the barcode reading device is a scan engine for use in a code scanner.

19. The camera system of claim 14, wherein the at least one PCB is formed of a single-piece, monolithic substrate.

20. The camera system of claim 14, further comprising a controller coupled to the at least one PCB on a side that is different than the image sensor such that the controller is aligned with the image sensor.

* * * * *